United States Patent
Chapelle et al.

(10) Patent No.: US 9,633,315 B2
(45) Date of Patent: Apr. 25, 2017

(54) METHOD AND SYSTEM FOR DISTRIBUTED MACHINE LEARNING

(75) Inventors: Olivier Chapelle, Sunnyvale, CA (US); John Langford, White Plains, NY (US); Miroslav Dudik, Brooklyn, NY (US); Alekh Agarwal, Berkeley, CA (US)

(73) Assignee: EXCALIBUR IP, LLC, Sunnyvale, CA (US)

(*) Notice: Subject to any disclaimer, the term of this patent is extended or adjusted under 35 U.S.C. 154(b) by 273 days.

(21) Appl. No.: 13/458,545

(22) Filed: Apr. 27, 2012

(65) Prior Publication Data

US 2013/0290223 A1 Oct. 31, 2013

(51) Int. Cl.
G06N 99/00 (2010.01)
G06F 15/18 (2006.01)

(52) U.S. Cl.
CPC ........... *G06N 99/005* (2013.01); *G06F 15/18* (2013.01)

(58) Field of Classification Search
None
See application file for complete search history.

(56) References Cited

U.S. PATENT DOCUMENTS 6,405,270 B1 * 6/2002 Chen ........................... 710/104
2007/0005530 A1 * 1/2007 Baartman ............. G06F 9/5066
706/16

OTHER PUBLICATIONS

Teo, C. et al. "A scalable modular convex solver for regularized risk minimization." Proceedings of the 13th ACM SIGKDD international conference on Knowledge discovery and data mining. ACM, 2007.*
Xie, J. et al. "Improving mapreduce performance through data placement in heterogeneous hadoop clusters." Parallel & Distributed Processing, Workshops and Phd Forum (IPDPSW), 2010 IEEE International Symposium on. IEEE, 2010.*
Ekanayake, J. et al. "Mapreduce for data intensive scientific analyses." eScience, 2008. eScience'08. IEEE Fourth International Conference on. IEEE, 2008.*
Bu, Y. et al. "HaLoop: Efficient iterative data processing on large clusters." Proceedings of the VLDB Endowment 3.1-2 (2010): 285-296.*
Teo, C., et al. "A scalable modular convex solver for regularized risk minimization." Proceedings of the 13th ACM SIGKDD international conference on Knowledge discovery and data mining. ACM, 2007.*

(Continued)

*Primary Examiner* — Kakali Chaki
*Assistant Examiner* — Eric Nilsson
(74) *Attorney, Agent, or Firm* — Pillsbury Winthrop Shaw Pittman LLP

(57) ABSTRACT

Method, system, and programs for distributed machine learning on a cluster including a plurality of nodes are disclosed. A machine learning process is performed in each of the plurality of nodes based on a respective subset of training data to calculate a local parameter. The training data is partitioned over the plurality of nodes. A plurality of operation nodes are determined from the plurality of nodes based on a status of the machine learning process performed in each of the plurality of nodes. The plurality of operation nodes are connected to form a network topology. An aggregated parameter is generated by merging local parameters calculated in each of the plurality of operation nodes in accordance with the network topology.

23 Claims, 15 Drawing Sheets

(56) References Cited

OTHER PUBLICATIONS

Xie, J., et al. "Improving mapreduce performance through data placement in heterogeneous hadoop clusters." Parallel & Distributed Processing, Workshops and Phd Forum (IPDPSW), 2010 IEEE International Symposium on. IEEE, 2010.*

Lee, G. "Embracing heterogeneity in scheduling MapReduce." CS267 Project Report (2011). [retrieved from berkeley.edu]. [retrieved Sep. 18, 2014].*

Chakravarti, A., et al. "The organic grid: self-organizing computation on a peer-to-peer network." Systems, Man and Cybernetics, Part A: Systems and Humans, IEEE Transactions on 35.3 (2005): 373-384.*

Zaharia, M. et al. "Resilient Distributed Datasets: A Fault-Tolerant Abstraction for In-Memory Cluster Computing"; Technical Report No. UCB/EECS-2011-82_Jul. 19, 2011.

Teo, Choon Hui Teo et al.; "A Scalable Modular Convex Solver for Regularized Risk Minimization"; KDD 07 Proceedings of the 13th ACM ISGKDD International Conference on Knowledge Discovery and Data Mining on Aug. 12, 2007.

McDonald, R. et al.; "Distributed Training Strategies for the Structured Perceptron"; Proceedings HLT '10 Human Language Technologies: 2010 Annual Conference of the North American Chapter of the Association for Computational Linguistics; Jun. 2-4, 2010 LA, CA.

Zinkevich, M. A. et al.; "Parallelized Stochastic Gradient Descent"; NIPS 2010 Advances in Neural Information Processing Systems 24th Annual Conference, Vancouver BC, CA; Dec. 6-9, 2010; Article appears on pp. 2595-2603 of proceedings.

Dekel, O. et al.; "Optimal Distributed Online Prediction Using Mini-Batches" Journal of Machine Learning Research 13 (Jan. 31, 2012) pp. 165-202.

Hsu, D. et al.; "Parallel Online Learning"; NIPS 2010 in Workshop on Learning on Cores, Clusters and Clouds, Dec. 11, 2010; Whistier, BC, CA.

Low, Y. et al.; "A New Framework for Parallel Machine Learning"; 26th Conference on Uncertainty in Artificial Intelligence; Jul. 2010; Catalina Island, CA.

Agarwal, A. et al.; "A Reliable Effective Terascale Linear Learning System"; Cargegie Mellon University, Dec. 4, 2011.

* cited by examiner

METHOD AND SYSTEM FOR DISTRIBUTED MACHINE LEARNING

BACKGROUND

1. Technical Field

The present teaching relates to methods, systems, and programming for distributed computing. Particularly, the present teaching is directed to methods, systems, and programming for distributed machine learning on a cluster.

2. Discussion of Technical Background

Distributed computing is a field of computer science that studies distributed systems, which include multiple autonomous computers or parallel virtual machines that communicate through a computer network, such as a computer cluster having multiple nodes. The machines in a distributed system interact with each other in order to achieve a common goal. In distributed computing, a problem is divided into many tasks, each of which is solved by one or more computers. Distributed systems and applications may be applied as various paradigms, including grid computing, utility computing, edge computing, and cloud computing by which users may access the server resources using a computer, netbook, tablet, smart phone, game console, set-top box, or other device through the Internet. A computer program that runs in the distributed system is called a distributed application. For instance, APACHE HADOOP is a software framework that supports data-intensive distributed applications under a free license. It enables applications to work with thousands of nodes and petabytes of data. Rather than relying on hardware to deliver high-availability, HADOOP is designed to detect and handle failures at the application layer, thereby delivering a highly-available service.

Distributed machine learning is one of the distributed applications where much work focuses on the problem in the form $$\min_{w \in \mathbb{R}^d} \sum_{i=1}^{n} l(w^T x_i; y_i) + \lambda R(w), \quad (1)$$

where $x_i$ is the feature vector of the i-th training sample, $y_i$ is the label, w is the linear predictor (parameters), l is a loss function, and R is a regularizer. Much of this work exploits the natural decomposability over training data ($x_i$, $y_i$) in Equation (1), partitioning the training data over different nodes of a cluster. One of the simplest learning strategies when the number n of training samples is very large is to subsample a smaller set of examples that can be tractably learned with. However, this solution only works if the problem is simple enough or the number of parameters w is very small.

Other known solutions include, for example, online learning with averaging, gossip-style message passing algorithms, delayed version of distributed online learning, mini-batch version of online algorithms with delay-based updates, applying alternating direction method of multipliers (ADMM) for distributed learning, and applying message passing interface (MPI) to parallelize a bundle method for optimization. However, the known solutions leave something to be desired empirically when deployed on large clusters. In particular, their throughput—measured as the input size divided by the wall clock running time—is smaller than the I/O interface of a single machine for almost all parallel learning algorithms. The I/O interface is an upper bound on the speed of the fastest sequential algorithm since all sequential algorithms are limited by the network interface in acquiring data. In addition, because of their incompatibility with HADOOP clusters, those MPI-based solutions cannot take advantage of features of HADOOP clusters, such as data locality and robustness.

Therefore, there is a need to provide an improved solution for distributed machine learning on very large datasets, e.g., a terascale dataset, using a cluster to solve the above-mentioned problems.

SUMMARY

The present teaching relates to methods, systems, and programming for distributed computing. Particularly, the present teaching is directed to methods, systems, and programming for distributed machine learning.

In one example, a method, implemented on at least one machine each of which has at least one processor, storage, and a communication platform connected to a network for distributed machine learning on a cluster including a plurality of nodes, is disclosed. A machine learning process is performed in each of the plurality of nodes based on a respective subset of training data to calculate a local parameter. The training data is partitioned over the plurality of nodes. A plurality of operation nodes are determined from the plurality of nodes based on a status of the machine learning process performed in each of the plurality of nodes. The plurality of operation nodes are connected to form a network topology. An aggregated parameter is generated by merging local parameters calculated in each of the plurality of operation nodes in accordance with the network topology.

In another example, a method, implemented on at least one machine each of which has at least one processor, storage, and a communication platform connected to a network for distributed machine learning on a cluster including a plurality of nodes, is disclosed. A subset of training data that is partitioned over the plurality of nodes is stored. A stochastic gradient descent process is performed based on the subset of the training data to calculate an initial local parameter. The initial local parameter is transmitted to at least one connected node in accordance with a network topology. An initial aggregated parameter is received from the at least one connected node. The initial aggregated parameter is calculated by merging initial local parameters calculated by each of the plurality of nodes in accordance with the network topology. A batch gradient descent process is performed based on the received initial aggregated parameter and the subset of the training data to calculate an updated local parameter. The updated local parameter is transmitted to the at least one connected node in accordance with the network topology for calculating an updated aggregated parameter.

In a different example, a system for distributed machine learning is disclosed. The system comprises a plurality of nodes and a coordination node. Each node is configured to perform a machine learning process based on a respective subset of training data to calculate a local parameter. The training data is partitioned over the plurality of nodes. The coordination node is operatively coupled to the plurality of operation nodes and is configured to determine a plurality of operation nodes from the plurality of nodes based on a status of the machine learning process performed in each of the plurality of nodes. The coordination node is also configured to connect the plurality of operation nodes to form a network topology. The plurality of operation nodes are configured to generate an aggregated parameter by merging local parameters calculated in each of the plurality of operation nodes in accordance with the network topology.

In another example, an apparatus is disclosed. The apparatus comprises a storage, an AllReducing module, and a machine learning module. The storage is configured to store a subset of training data that is partitioned over the plurality of nodes. The AllReducing module is configured to transmit a local parameter to at least one connected node in accordance with a network topology and receive an aggregated parameter from the at least one connected node. An initial aggregated parameter is calculated by merging initial local parameters calculated by each of the plurality of nodes in accordance with the network topology. The machine learning module is configured to perform a stochastic gradient descent process based on the subset of the training data to calculate the initial local parameter and perform a batch gradient descent process based on the initial aggregated parameter and the subset of the training data to calculate an updated local parameter. The updated local parameter is transmitted to the at least one connected node for calculating an updated aggregated parameter.

Other concepts relate to software for distributed machine learning on a cluster including a plurality of nodes. A software product, in accord with this concept, includes at least one machine-readable and non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for distributed machine learning on a cluster including a plurality of nodes, wherein the information, when read by the machine, causes the machine to perform a series of steps. A machine learning process is performed in each of the plurality of nodes based on a respective subset of training data to calculate a local parameter. The training data is partitioned over the plurality of nodes. A plurality of operation nodes are determined from the plurality of nodes based on a status of the machine learning process performed in each of the plurality of nodes. The plurality of operation nodes are connected to form a network topology. An aggregated parameter is generated by merging local parameters calculated in each of the plurality of operation nodes in accordance with the network topology.

In another example, a machine readable and non-transitory medium having information recorded thereon for distributed machine learning on a cluster including a plurality of nodes, wherein the information, when read by the machine, causes the machine to perform a series of steps. A subset of training data that is partitioned over the plurality of nodes is stored. A stochastic gradient descent process is performed based on the subset of the training data to calculate an initial local parameter. The initial local parameter is transmitted to at least one connected node in accordance with a network topology. An initial aggregated parameter is received from the at least one connected node. The initial aggregated parameter is calculated by merging initial local parameters calculated by each of the plurality of nodes in accordance with the network topology. A batch gradient descent process is performed based on the received initial aggregated parameter and the subset of the training data to calculate an updated local parameter. The updated local parameter is transmitted to the at least one connected node in accordance with the network topology for calculating an updated aggregated parameter.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficient and reliable large scale distributed machine learning on a cluster. The method and system as disclosed herein aim at efficiently and effectively parallel learning very large datasets, including for example, trillions of features, billions of training samples, and millions of parameters, with a good predictive accuracy. For example, the method and system are able to achieve a throughput of 500M features/sec, which is at least 20 times faster than known solutions. Also, compared with MPI-based approaches, the method and system take advantage of and are compatible with HADOOP so that programs are easily moved to data and the robustness from failure via restart and speculative execution is useful. Moreover, unlike sequential algorithm-based approaches, the method and system are broadly reusable for many tasks as minimal additional programming effort is needed to parallelize existing learning algorithms. In other words, the method and system provide a new architecture for parallel learning based on a HADOOP-compatible implementation of AllReduce operations (e.g., in MPI) and yield a combination of excellent prediction and training time performance in an easy programming style. The hybrid optimization algorithm employed by the method and system also benefits from both the rapid initial optimization by online algorithms, e.g., stochastic gradient descent, and the high precision of batch algorithms, e.g., batch gradient descent, where the last percent of performance really matters.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

Figure 1:
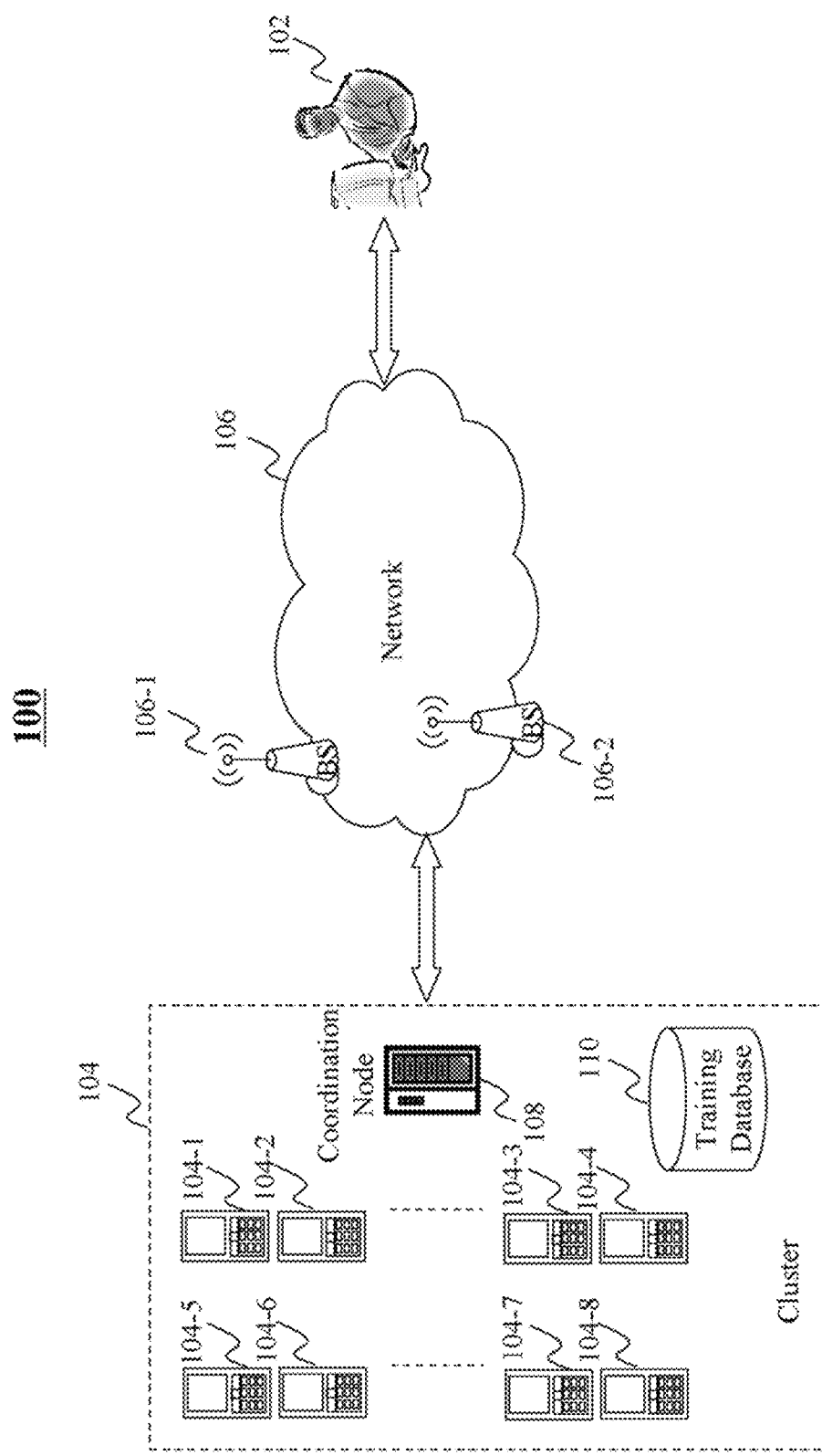
FIG. 1 depicts an exemplary embodiment of a networked environment in which distributed machine learning is applied, according to an embodiment of the present teaching.

FIG. 1 depicts an exemplary embodiment of a networked environment in which distributed machine learning is applied, according to an embodiment of the present teaching. The exemplary networked environment 100 includes one or more users 102, a cluster 104, and a network 106. In this exemplary networked environment 100, a user 102, who may be a network administrator, operator, developer, or customer of the cluster 104, may send a request to the cluster 104 via the network 106 or via an internal or proprietary network connection (not shown) to start the distributed machine learning process and retrieve a result from the cluster 104. The term "machine learning process" referred herein may include any process that tunes a number of parameters to be simultaneously optimal on training dataset using one or more machines.

The network 106 may be a single network or a combination of different networks. For example, the network 106 may be a local area network (LAN), a wide area network (WAN), a public network, a private network, a proprietary network, a Public Telephone Switched Network (PSTN), the Internet, a wireless network, a virtual network, or any combination thereof. The network 106 may also include various network access points, e.g., wired or wireless access points such as base stations or Internet exchange points 106-1, ..., 106-2, through which a data source may connect to the network in order to transmit information via the network.

The cluster 104 in which the distributed machine learning is performed includes a plurality of regular nodes 104-1, 104-2, ... 104-7, 104-8, and at least one coordination node 108 (e.g., a gateway node in a HADOOP cluster), which communicate through the network 106 or through an internal network (not shown). In this example, each node of the cluster 104 may be an autonomous physical machine, such as a server, a workstation, a desktop or laptop computer, a netbook, a tablet, a smart phone, a game console, a set-top box, or any other suitable machine. In another example, some or all of the nodes may be parallel virtual machines implemented by either software emulation or hardware virtualization. The cluster 104 may be a set of machines owned by one entity, e.g., an enterprise, and maintained as a server farm or server cluster where the servers are mounted on racks in a server room or data center. The cluster 104 may also be a collection of machines owned by different entities and that are physically separate from each other at a distance.

In this example, the cluster 104 may also include a training database 110 that stores one or more very large training datasets, for example, each including trillions of features, billions of training samples, and millions of parameters, for distributed machine learning performed on the cluster 104. For example, training datasets may be recorded on a remote server (not shown) outside the cluster 104 and transmitted (e.g., copied) to the training database 110 through the coordination node 108 prior to the learning process starts. By the time of running the distributed machine learning process, the training datasets have already resided on the cluster 104, for example, in the central training database 110 of the cluster 104, as shown in FIG. 1, or have been partitioned across the regular nodes 104-1, 104-2, ... 104-7, 104-8 of the cluster 104. In one example, a preprocessing step may have been performed in a HADOOP cluster as a HADOOP job to split training data randomly across the regular nodes 104-1, 104-2, ... 104-7, 104-8. In any event, the cluster 104 in this example acts as both the data storage and the computational resource for achieving high data locality which in turn results in high performance.

Figure 2:
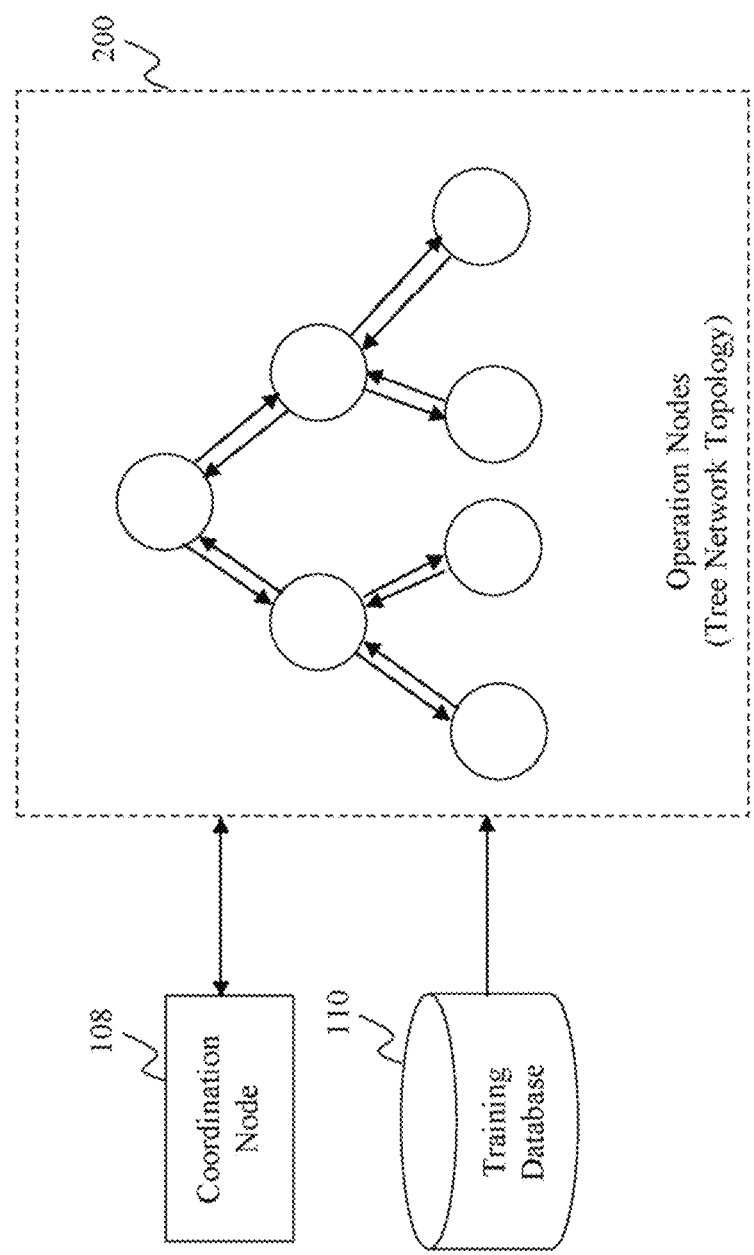
FIG. 2 is a high level exemplary system diagram of a system for distributed machine learning in which operation nodes are connected according to a tree network topology, according to an embodiment of the present teaching.
Figure 3:
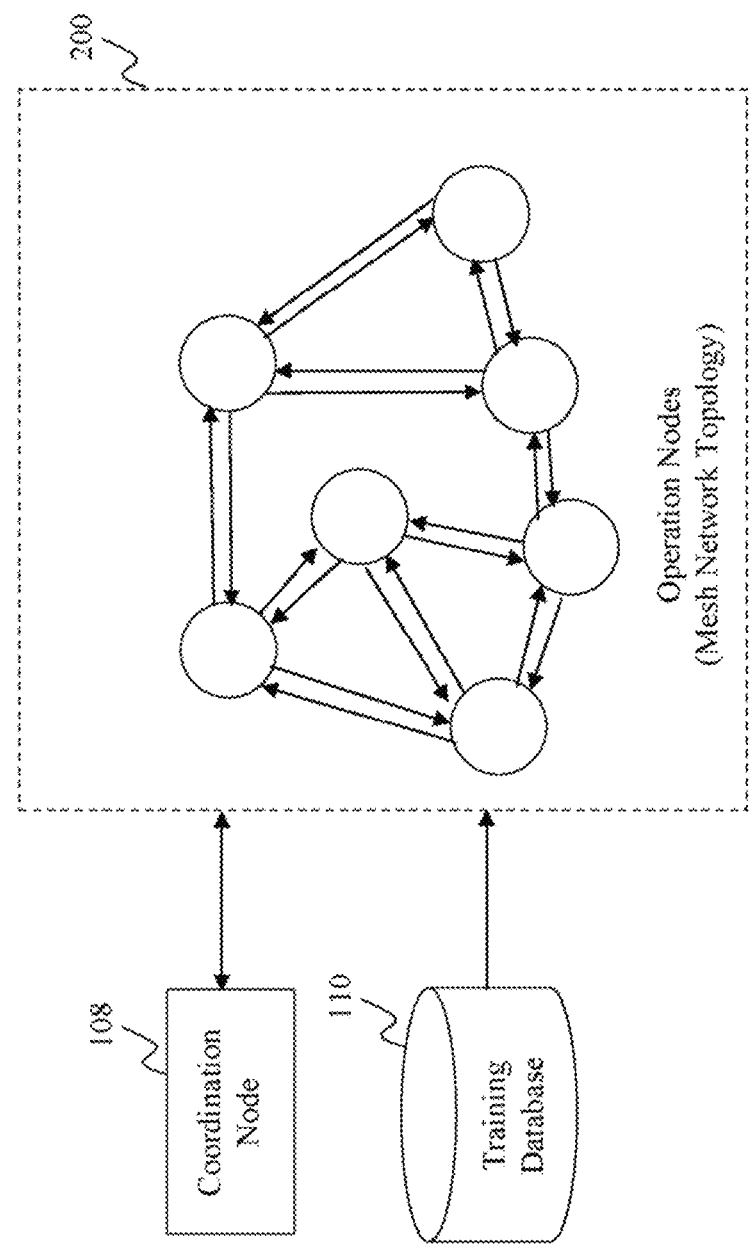
FIG. 3 is a high level exemplary system diagram of a system for distributed machine learning in which operation nodes are connected according to a mesh network topology, according to an embodiment of the present teaching.

FIGS. 2 and 3 are high level exemplary system diagrams of a system for distributed machine learning in which operation nodes are connected according to different network topologies, according to different embodiments of the present teaching. The coordination node 108 may be, for example, the gateway node of a HADOOP cluster, which is a special node that serves as an entry point and/or proxy when a user accesses the HADOOP cluster. The coordination node 108 in this example is configured to determine a plurality of operation nodes 200 from the plurality of regular nodes based on a status of the machine learning process performed in each regular node. The status is received by the coordination node 108 from each regular node of the cluster 104. The coordination node 108 is further configured to connect the plurality of operation nodes 200 to form a network topology. The network topology includes, but is not limited to, tree (hierarchical), full or partial mesh, ring, bus, star, extended star, line, or any combination thereof. In order to connect the determined operation nodes 200, the coordination node 108 may first define a desired network topology linking all the operation nodes 200. Based on the defined network topology, the coordination node 108 then may send a connection instruction to each operation node. The connection instruction includes information identifying all other operation nodes that are connected to a particular operation node in accordance with the network topology and any other suitable information for forming the network topology. For example, hierarchy information, e.g., root node, leaf node, etc., may be included in the connection instruction in order to form a tree network topology. The nodes to be connected may be identified by, for example, domain name, IP address, alias, or any other suitable mechanism, in the connection instruction.

Figure 4:
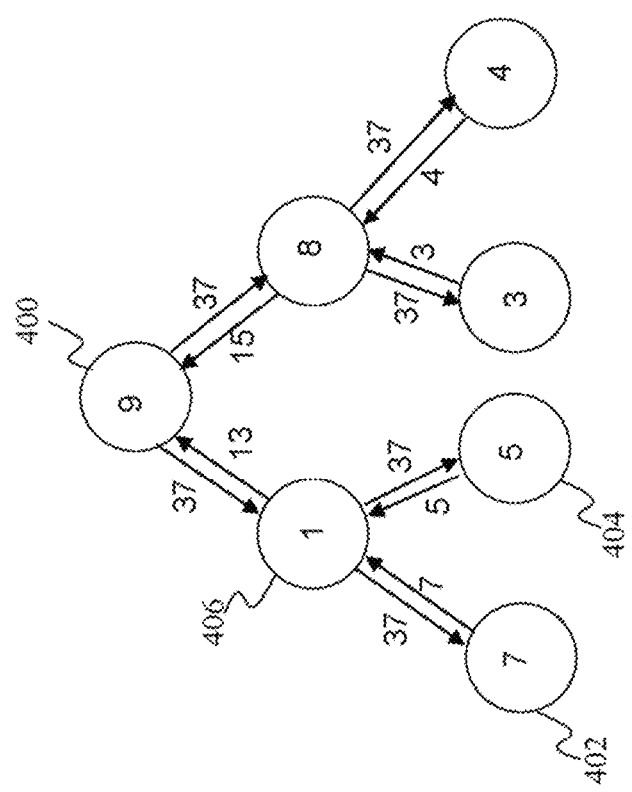
FIG. 4 illustrates an exemplary AllReduce operation.

In FIG. 2, a tree network topology is applied to connect the operation nodes 200 by the coordination node 108, which is suitable for applying AllReduce operation over the operation nodes 200. AllReduce operation is an operation where every node starts with a number and ends up with the sum of the numbers at all the nodes. Now referring to FIG. 4, each node of the tree network first calculates its local number (e.g., "9" by the root node 400, "7" by the leftmost leaf node 402, "5" by the second leftmost leaf node 404, "1" by the left middle node 406.). Each node then receives the local numbers calculated by all the connected nodes that are one level lower in the hierarchy and sums up the received local numbers and its own local number. For example, node 406 receives "7" and "5" from nodes 402, 404, respectively, and adds those numbers to "1" to obtain the number "13." This process is repeated until the root node 400 calculates the "reduced" number "37." In other words, an aggregated number is calculated by the operation nodes 200 by merging local numbers calculated in each operation node in accordance with the network topology. As shown in FIG. 4, the aggregated number "37" is then broadcasted down from the root node 400 to each operation node in the cluster 104 such that each operation node contains the aggregated number. The AllReduce operation (reduce and broadcast operations) can be repeated such that the aggregated number in each iteration may be applied to the calculation in the next iteration for each operation node. The reduce and broadcast operations may be pipelined over a vector making latency essentially a non-issue.

In FIG. 3, a mesh network topology is applied to connect the operation nodes 200 by the coordination node 108. Similarly, AllReduce operation may be performed by the operation nodes 200 following the node connections in accordance with the mesh network topology. In this example, the training data stored in the training database 110 has been partitioned over the operation nodes 200. Each operation node is configured to perform a machine learning process based on a respective subset of training data to calculate a local parameter (e.g., a gradient). As described above, the plurality of operation nodes 200 then generate an aggregated parameter (e.g., gradients aggregation) by merging local parameters calculated in each operation node in accordance with the mesh network topology.

Figure 5:
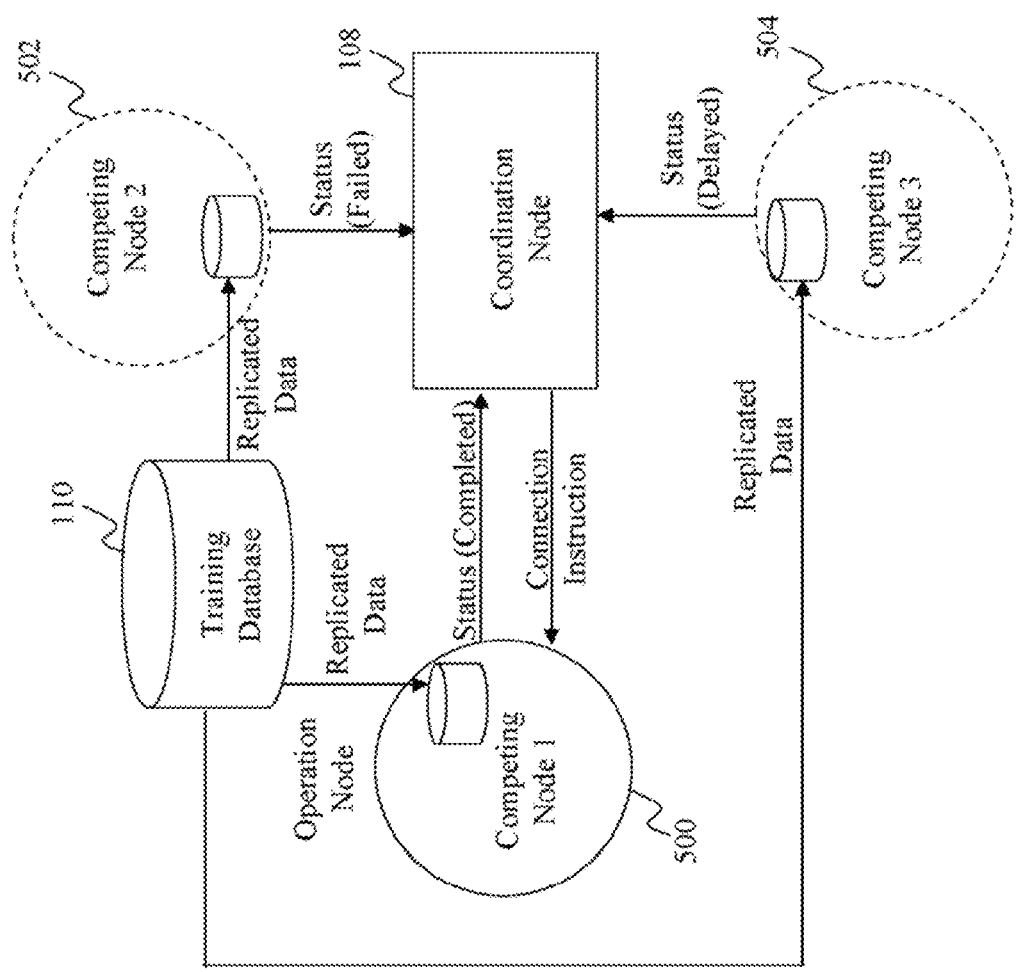
FIG. 5 is a depiction of how to determine an operation node from competing nodes with the same subset of training data, according to an embodiment of the present teaching.

FIG. 5 is a depiction of how to determine an operation node from competing nodes with the same subset of training data, according to an embodiment of the present teaching. It is noted that the reliability issue or fault tolerance is a major concern of AllReduce operation because if any individual node fails, the entire computation may fail. To improve robustness, the method and system disclosed herein, instead of simply connecting all regular nodes 104-1, 104-2, . . . 104-7, 104-8 of the cluster 104 or randomly choosing some of the regular nodes 104-1, 104-2, . . . 104-7, 104-8, first determine operation nodes from competing nodes based on speculatively executing a job on identical data and then connect only those determined operation nodes that are proven to be reliable. In other words, the initialization of node connection is delayed until a node completes a pass over the training data, building the network topology on only the nodes survived from speculative execution.

To apply speculative execution, the same subset of training data may be first allocated to a plurality of competing nodes prior to performing a machine learning process. In FIG. 5, the same subset of training data is allocated from the training database 110 to three competing nodes 500, 502, 504 prior to performing a machine learning process. The default replication factor in HADOOP is 3. However, it is understood that a different replication factor, i.e., different number of competing nodes, may be applied in other examples. The same machine learning process is then performed by each competing node 500, 502, 504 on the replicated data. The first competing node that finishes the process may report a "completed" status to the coordination node 108. As a result, the coordination node 108 determines that the competing node 1 500, in this example, is an operation node that can be connected and then kills machine learning process running on the other two competing nodes 502, 504. That is, the coordination node 108 may determine an operation node from the competing nodes with the replicated training data based on a processing speed of each competing node. In another example, instead of waiting for one competing node to finish the job, the coordination node 108 may inquire the status from each competing node after a certain time period. As shown in FIG. 5, the competing node 2 502 reports a "failed" status, which may be caused by any machine failure; the competing node 3 504 reports a "delayed" status, which indicates that the competing node 3 is busy handling other jobs. Nevertheless, once an operation node is determined from the competing nodes, the coordination node 108 then sends a connection instruction to the operation node, as described above. It is understood that, in case all the competing nodes are failed or delayed, the coordination node 108 may transfer the replicated data to an available node in the cluster 104 where the job can be executed.

Figure 6:
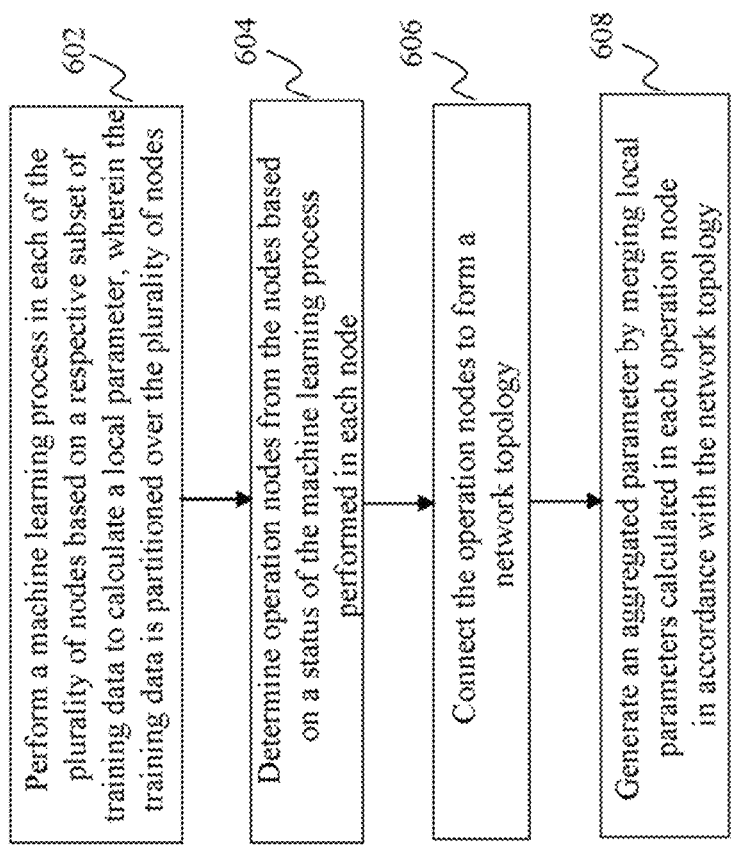
FIG. 6 is a flowchart of an exemplary process for distributed machine learning, according to an embodiment of the present teaching.

FIG. 6 is a flowchart of an exemplary process in which distributed machine learning is performed, according to an embodiment of the present teaching. Beginning at block 602, a machine learning process is performed in each of the plurality of nodes based on a respective subset of training data to calculate a local parameter (e.g., a gradient). The training data is partitioned over the plurality of nodes. The term "machine learning process" referred herein may include any process that tunes a number of parameters to be simultaneously optimal on training data using one or more machines. The machine learning process includes, but is not limited to, locally weighted linear regression (LWLR), k-means, logistic regression (LR), naive Bayes (NB), support vector machine (SVM), independent component analysis (ICA), principal component analysis (PCA), Gaussian discriminant analysis (GDA), expectation maximization (EM), and neural network (NN). As described above, this may be performed by the regular nodes 104-1, 104-2, . . . 104-7, 104-8 of the cluster 104. At block 604, processing may continue where a plurality of operation nodes are determined from the plurality of nodes based on a status of the machine learning process performed in each node. For example, an operation node may be determined from competing nodes with the same subset of the training data based on a processing speed of each competing node. At block 606, the plurality of operation nodes are connected to form a network topology. As described above, blocks 604, 606 may be performed by the coordination node 108 of the cluster 104. At block 608, an aggregated parameter (e.g., gradients aggregation) is generated by merging local parameters calculated in each operation node in accordance with the network topology. As described above, this may be performed by the operation nodes 200 of the cluster 104.

Figure 7:
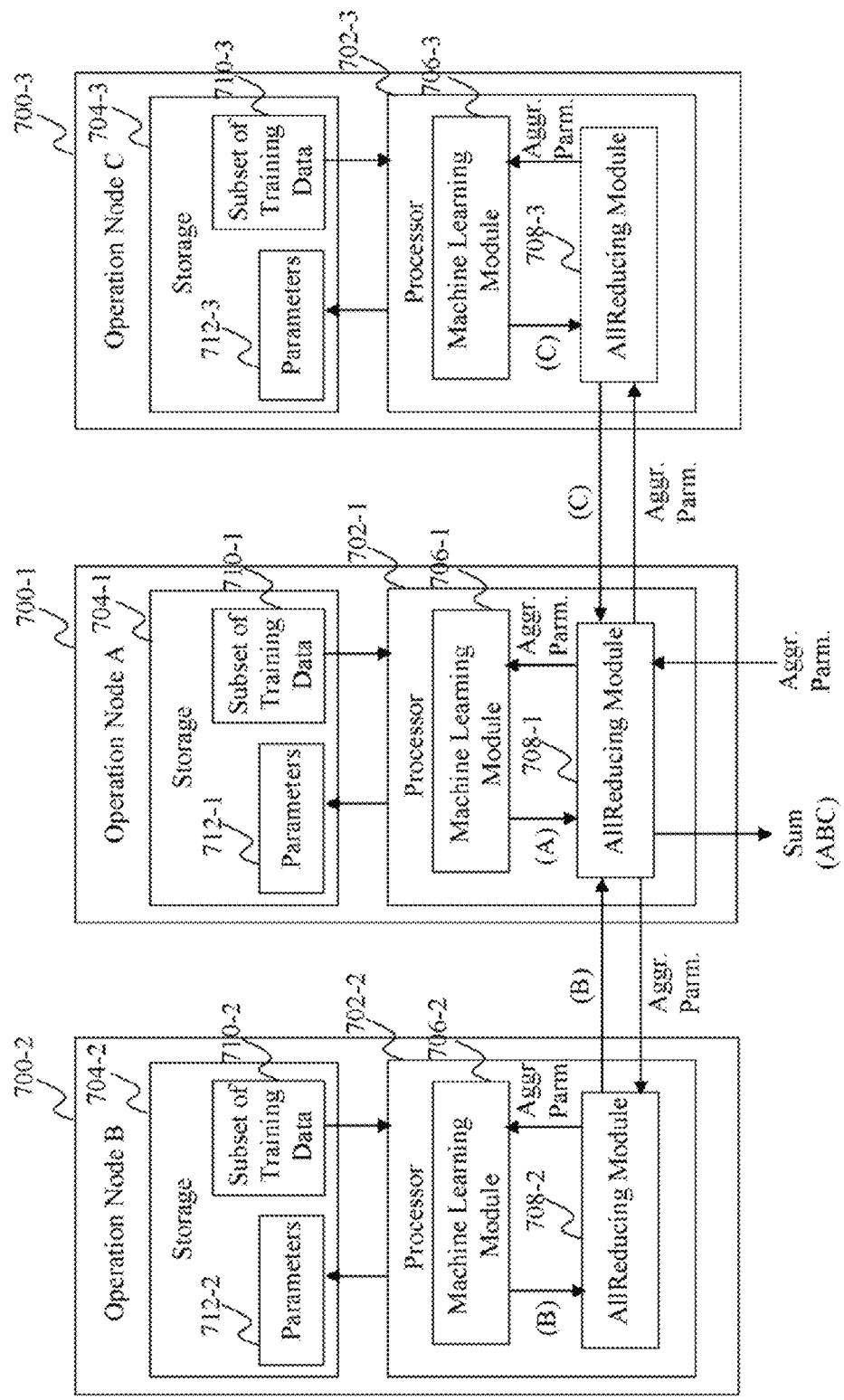
FIG. 7 is an exemplary diagram of operation nodes of the system for distributed machine learning shown in FIGS. 2 and 3, according to an embodiment of the present teaching.
Figure 8:
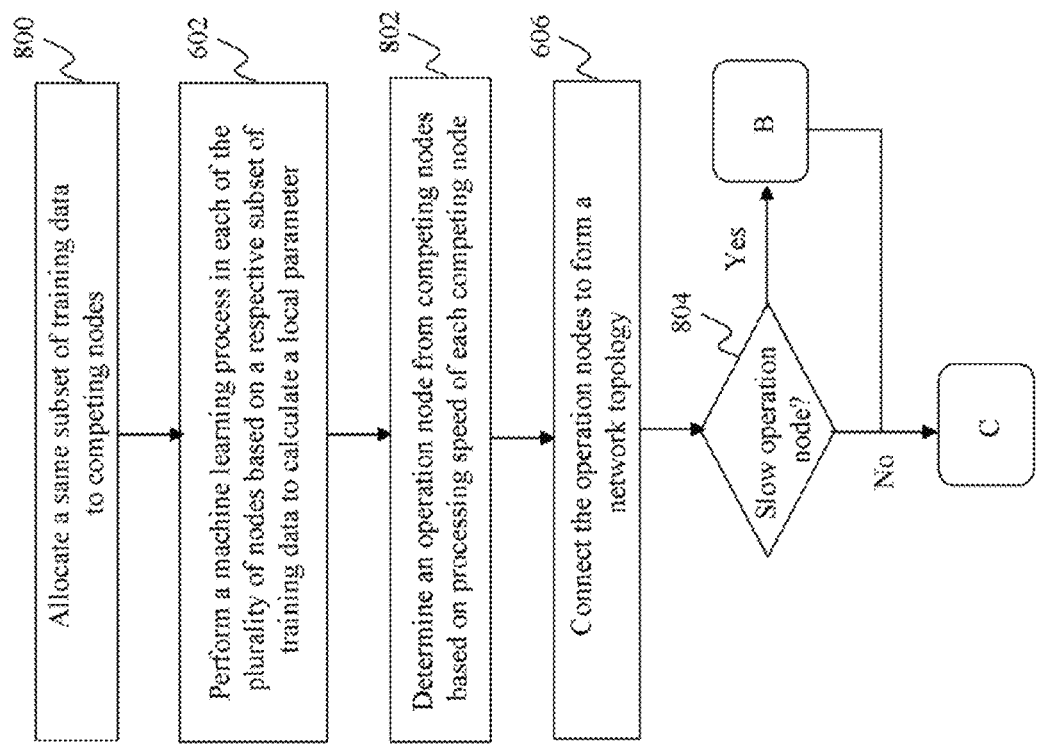
FIGS. 8-10 are more detailed flowcharts of the exemplary process for distributed machine learning shown in FIG. 6, according to different embodiments of the present teaching.

FIG. 7 is an exemplary diagram of operation nodes of the system for distributed machine learning as shown in FIGS. 2 and 3, according to an embodiment of the present teaching. FIG. 7 illustrates three exemplary operation nodes—operation node A 700-1, operation node B 700-2, and operation node C 700-3—connected in a tree network topology. In this example, operation nodes B, C may be leaf nodes, i.e., the nodes at the lowest level of the hierarchy, and operation node A may be a middle node that is one level above operation nodes B, C in the tree network topology and that is connected to operation nodes B, C. In this example, operation node A may be further connected to another operation node (not shown) that is one level above in the hierarchy, for example, root node or another middle node in the tree network topology. As described above, the operation nodes A, B, C may be survivors of speculative execution, and their connections may be determined by the coordination node 108 in accordance with a defined tree network topology.

Each operation node 700 in FIG. 7 includes a processor 702 and a storage 704 operatively coupled to each other. The operation node 700 may further include any other suitable component (not shown), such as, but not limited to memory, communication platform, I/O devices, etc. In this example, a machine learning module 706 and an AllReducing module 708 are executed and running on the processor 702 in each operation node. The storage 704 includes at least a data storage 710 for temporally or permanently storing a subset of training data assigned to a specific operation node and a parameter storage 712 for temporally or permanently storing local and aggregated parameters (e.g., in the form of parameter vectors) optimized by distributed machine learning.

For example, as described before, during the reduce stage in each iteration, the machine learning module 706 is configured to perform a machine learning process based on a respective subset of training data stored in the local data storage 710 to calculate a local parameter (e.g., gradient). "A," "B," and "C" in FIG. 7 represent the local parameters calculated by operation nodes A, B, C, respectively. In this example, different optimization algorithms may be applied by the machine learning module 706 in the first iteration and the following iterations. For example, an online optimization algorithm such as a stochastic gradient descent process may be applied in the initial iteration to generate initial local parameters, while a batch optimization algorithm such as a batch gradient descent process may be applied in the following iterations to generate updated local parameters. Nevertheless, each calculated local parameter A, B, C is provided to the AllReducing module 708 of the corresponding operation node in each iteration.

The AllReducing module 708 is also configured to transmit the local parameter to at least one connected node in accordance with the network topology. In this example, operation nodes B, C transmit their local parameters B, C to operation node A in accordance with the tree network topology. The AllReducing module 708 is also responsible for merging local parameter with one or more local parameters received from one or more connected nodes in accordance with the network topology. In this example, the AllReducing module 708-1 of operation node A sums up the local parameter A calculated by the local machine learning module 706-1 and the local parameters B, C received from operation nodes B, C. The merged local parameter "sum (ABC)" is then transmitted to another connected operation node (not shown) that is higher in the hierarchy. Eventually, at the end of the reduce stage in each iteration, an aggregated parameter is calculated by merging local parameters calculated by each operation node in accordance with the network topology, as noted above.

Moving to the broadcast stage, the AllReducing module 708 is further configured to receive the aggregated parameter from the at least one connected node that is higher in the hierarchy. In this example, operation nodes B, C receive the aggregated parameter from operation node A, respectively. In each iteration, the aggregated parameter may be stored in the parameter storage 712 by each operation node such that the aggregated parameter may be retrieved by a user from any one of the operation nodes in the cluster 104. The stored aggregated parameter in each iteration may be applied to the machine learning process in the next iteration by the machine learning module 706. As discussed above, after the first iteration for calculating an initial aggregated parameter, the machine learning module 706 may perform a batch gradient descent process based on the initial aggregated parameter stored in the parameter storage 712 and the subset of the training data stored in the data storage 710 to calculate an updated local parameter in each of the following iterations to continuously optimize the aggregated parameters.

Figure 9:
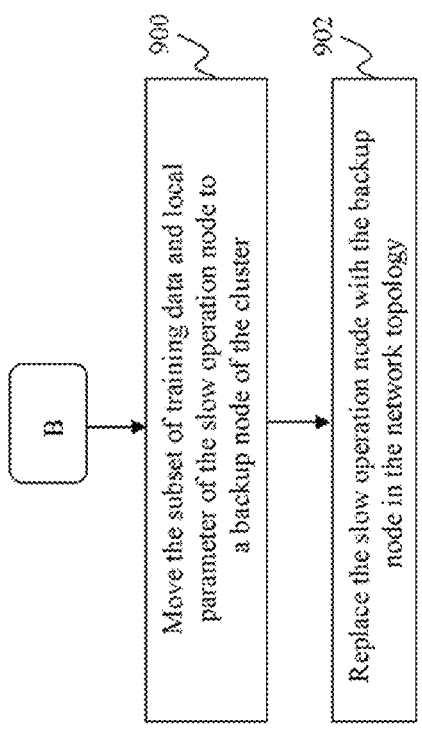
Figure 10:
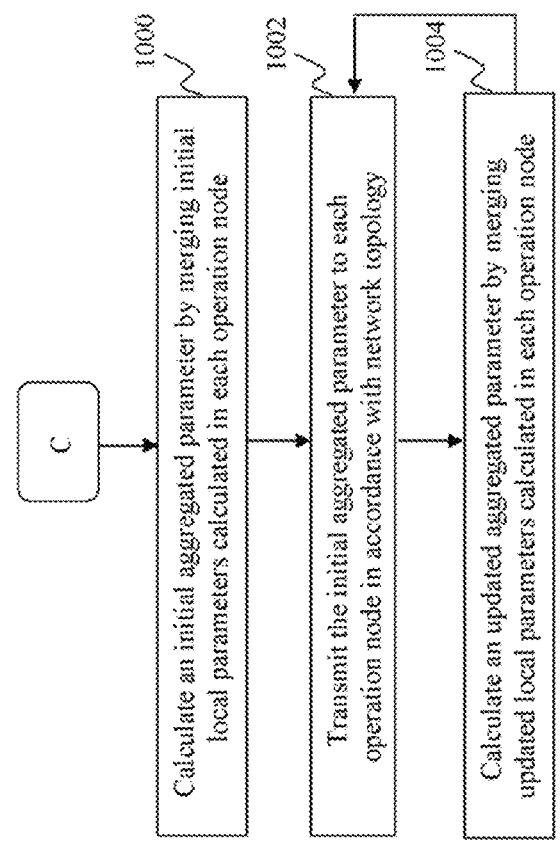
Figure 11:
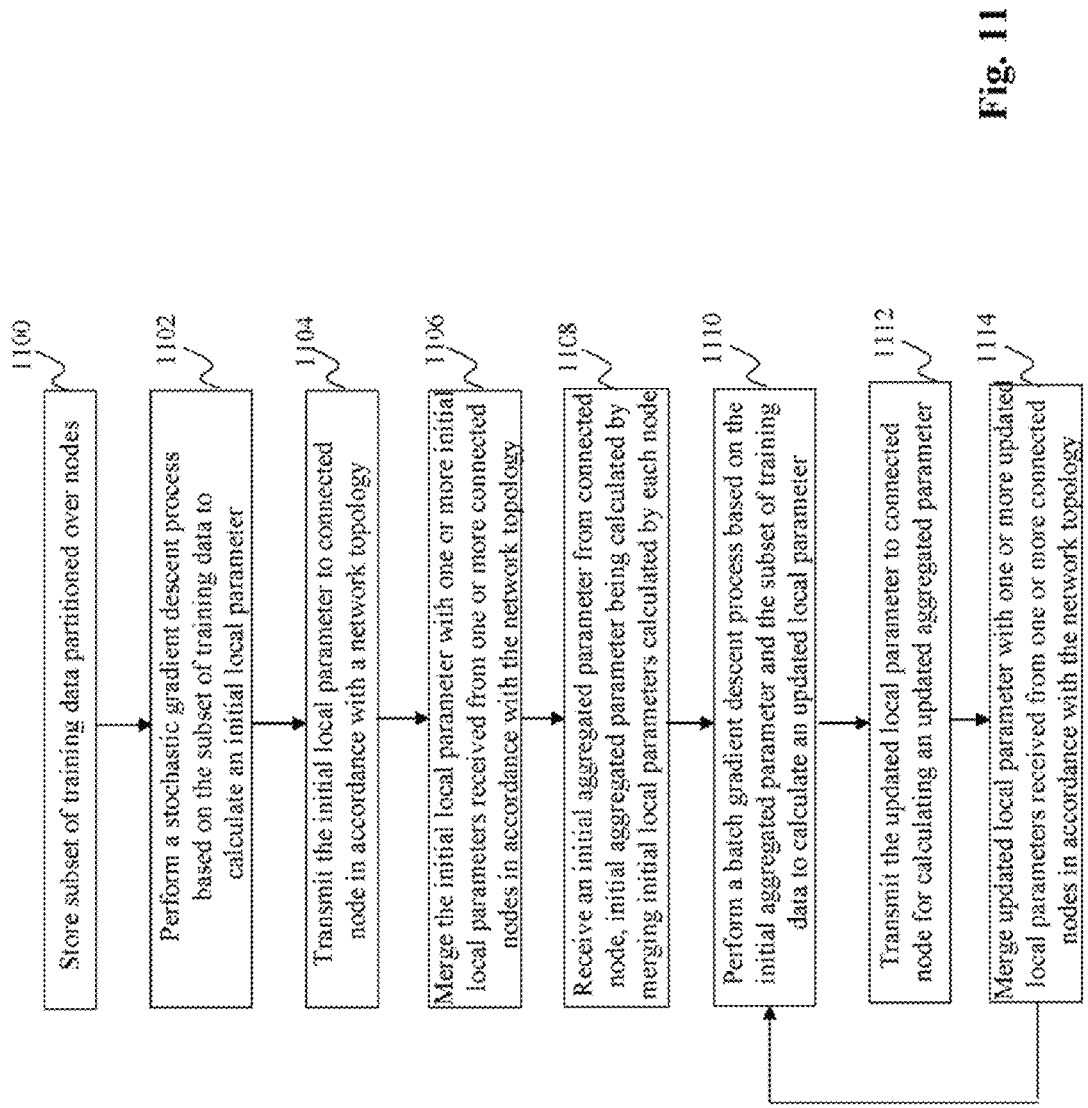
FIG. 11 is a flowchart of another exemplary process for distributed machine learning, according to an embodiment of the present teaching.

FIGS. 9-11 are more detailed flowcharts of the exemplary process for distributed machine learning shown in FIG. 6, according to different embodiments of the present teaching. Beginning at block 800, the same subset of the training data is allocated to competing nodes, for example, from the training database 110 of the cluster 104. At block 602, processing may continue where a machine learning process is performed in each node based on a respective subset of training data to calculate a local parameter. As described above, this may be performed by the regular nodes 104-1, 104-2, . . . 104-7, 104-8 of the cluster 104. At block 802, an operation node is determined from competing nodes based on processing speed of each competing node. Proceeding to block 606, the plurality of operation nodes are connected to form a network topology. As described above, blocks 802, 606 may be performed by the coordination node 108 in conjunction with the operation nodes 200 of the cluster 104.

At block 804, whether there is a slow (or died) operation node is dynamically detected based on the processing speed of each operation node. If a slow or died operation node is detected, processing may continue to FIG. 9. At block 900, the subset of training data and local parameter of the slow or died operation node is moved to a backup node in the cluster 104. At block 902, the slow or died operation node is replaced with the backup node in the network topology. For example, HADOOP may launch a replicate job, initialize the backup node with the current parameter vector, and replace the slow or died operation node by the backup node in the network topology. It is noted that the slow node detection and replacement mechanism may be dynamically applied during all iterations of the machine learning process. As a result, the method and system are reliable even if an operation node becomes slow or dies after the first iteration, when speculative execution becomes unavailable to replace that node.

Back to block 804, if no slow or died operation node has been detected, processing may continue to FIG. 10. At block 1000, an initial aggregated parameter is calculated by merging initial local parameters calculated in each operation node. For example, a stochastic gradient descent process, or any online optimization algorithm, is performed in each operation node for calculating the initial local parameter in the first iteration. At block 1002, the initial aggregated parameter is transmitted to each operation node in accordance with the network topology. That is, in the first iteration, a reduce operation is performed to sum up all local parameters calculated based on a rapid initial optimization algorithm by all operation nodes, followed by a broadcast operation that provides the initial aggregated parameter to each operation node. Proceeding to block 1004, an updated aggregated parameter is calculated by merging updated local parameters calculated in each operation node. Each updated local parameter is calculated based on the initial aggregated parameter and the subset of the training data in each operation node. For example, after the first iteration, a batch gradient descent process, or any batch optimization algorithm, is performed in each operation node for calculating the updated local parameter based on the initial aggregated parameter obtained from the first iteration and the local training data. Processing may then loop back to block 1002, where a broadcast operation is performed to transmit the updated aggregated parameter to each operation node in each following iteration. As described above, blocks 1000, 1002, 1004 may be performed by the machine learning module 706 in conjunction with the AllReducing module 708 of the operation nodes. As described above, a hybrid online-batch approach is applied in blocks 1000, 1002, 1004 for optimization in distributed settings.

FIG. 11 is a flowchart of another exemplary process for distributed machine learning, according to an embodiment of the present teaching. Processing in FIG. 11 is performed from each operation node's perspective. Beginning at block 1100, a subset of training data that is partitioned over the plurality of nodes is stored, for example, in a local data storage 710 of an operation node 700. At block 1102, a stochastic gradient descent process is performed based on the subset of the training data to calculate an initial local parameter in the first iteration, for example, by a machine learning module 706 of the operation node 700. Moving to block 1104, the initial local parameter is transmitted to at least one connected node in accordance with the network topology. At block 1106, processing may continue where the initial local parameter with one or more initial local parameters received from one or more connected nodes are merged in accordance with the network topology. At block 1108, an initial aggregated parameter is received from the at least one connected node. The initial aggregated parameter is calculated by merging initial local parameters calculated by each node in accordance with the network topology. As described above, blocks 1104, 1106, 1108 may be performed by the AllReducing module 708 of the operation node 700.

Proceeding to block 1110, after the first iteration, a batch gradient descent process is performed based on the received initial aggregated parameter and the subset of the training data to calculate an updated local parameter, for example by the machine learning module 706 of the operation node 700. At bock 1112, the updated local parameter is transmitted to the at least one connected node in accordance with the network topology for calculating an updated aggregated parameter. At block 1114, the updated local parameter is merged with one or more updated local parameters received from the one or more connected nodes in accordance with the network topology for calculating the updated aggregated parameter. As described above, blocks 1110, 1112, 1114 may be performed by the AllReducing module 708 of the operation node 700. Processing may then loop back to block 1110 to repeat blocks 1110, 1112, 1114 in each following iteration.

Although the processing illustrated in FIGS. 9-11 are illustrated in a particular order, those having ordinary skill in the art will appreciate that the processing can be performed in different orders.

Exemplary Algorithms

Algorithms for implementing the above-mentioned hybrid online-batch optimization approach on the system for distributed machine learning are provided below for exemplary purposes only.

The first algorithm starts with each node making one online pass over its local data according to adaptive gradient updates modified for loss nonlinearity. AllReduce operation is used to average these weights non-uniformly using the local gradients (local parameters). Concretely, node k maintains a local weight vector $w^k$ and a diagonal matrix $G^k$ based on the gradients in the adaptive gradient updates (see Algorithm 1). The following weighted average is calculated over all m nodes $$\bar{w} = \left(\sum_{k=1}^{m} G^k\right)^{-1} \left(\sum_{k=1}^{m} G^k w^k\right) \quad (2)$$

This has the effect of weighing each dimension according to how "confident" each node is in its weight (i.e., more weight is assigned to a given parameter of a given node, if that node has seen more examples with the corresponding feature). It is noted that this averaging can indeed be implemented using AllReduce operation by two calls to the routine since $G^k$ is only diagonal. This solution $\bar{w}$ is used to initialize limited-memory Broyden-Fletcher-Goldfarb-Shanno (L-BFGS) algorithm with the standard Jacobi preconditioner. In each iteration, the local gradients (parameters) are summed up using AllReduce operation, while all the other operations can be done locally at each node. The algorithm benefits from the fast reduction of error initially that an online algorithm provides, and rapid convergence in a good neighborhood guaranteed by Quasi-Newton algorithms.

---
Algorithm 1
Stochastic gradient descent algorithm on a single
node using adaptive gradient update ---
Require: Invariance update function s
 w = 0, G = I
 for all (x,y) in training set do
  $g \leftarrow \nabla_w l(w^T x; y)$
  $w \leftarrow w - s(w,x,y)G^{-1/2}g$
  $G_{jj} \leftarrow G_{jj} + g_j^2$ for all j = 1,...,d
 end for

---

The implementation is summarized in Algorithm 2, which makes use of the stochastic gradient descent (Algorithm 1) for the initial iteration.

---
Algorithm 2

---
Require: Data partitioned over nodes
 for all nodes k do
  $w^k$ = result of stochastic gradient descent
   on the data of node k using Algorithm 1.
 end for
 Compute the weighted average $\bar{w}$ as in (2)
   using AllReduce.
 Start a preconditioned L-BFGS optimization from $\bar{w}$.
 for all nodes k do
  for t = 1, . . . , T do
   Compute $g^k$ the (local batch) gradient
    of examples on node k
   Compute $g = \Sigma_{k=1}^m g^k$ using AllReduce.

Algorithm 2

Add the regularization part in the gradient.
Take an L-BFGS step.
end for
end for Another strategy is that of repeated online learning with averaging using the adaptive updates. In this setting, each node performs an online pass over its data, and then weights are averaged according to Equation (2). The scaling matrices are averaged similarly, and the averaged state is used to start a new online pass over the data.

$$\bar{G} = \left(\sum_{k=1}^{m} G^k\right)^{-1} \left(\sum_{k=1}^{m} (G^k)^2\right) \quad (3)$$

Experiments

Experiments are performed on two exemplary dataset—display advertising and splice site recognition—using the exemplary algorithms by the system for distributed machine learning as disclosed herein.

For display advertising dataset, given a user visiting a publisher page, the problem is to select the best advertisement for that user. A key element in this matching problem is the click-through rate (CTR) estimation: what is the probability that a given advertisement will be clicked given some context (user, page visited)? Indeed, in a cost-per-click (CPC) campaign, the advertiser only pays when the advertisement gets clicked, so even a modest improvement in predicative accuracy directly affects revenue.

There are several features representing the user, page, advertisement, as well as conjunctions of these features. Some of the features include identifiers of the advertisement, advertiser, publisher and visited page. These features are hashed and each training sample ends up being represented as a sparse binary vector of dimension $2^{24}$ with around 100 non-zero elements. For example, an advertisement from ETRADE was placed on finance.yahoo.com. Let h be a 24 bit hash of the string "publisher=finance.yahoo.com and advertiser=etrade." Then the (publisher, advertiser) conjunction is encoded by setting to 1 the h-th dimension of the feature vector for that example. Since the data is unbalanced (low CTR) and because of the large number samples, the negative examples are subsampled, resulting in a class ratio of about two negatives for one positive, and used a large test set drawn from days later than the training dataset. There are 2.3 B samples in the training dataset.

For splice site recognition dataset, the problem consists of recognizing a human acceptor splice site, which may be the largest public data for which subsampling is not an effective learning strategy. The training and test data sets include respectively 50M and 4.6M samples, and the kernel of degree is 20 and hash size is 12. The feature space induced by this kernel has dimensionality of 11,725,480. The number of non-zero features per sequence is about 3300.

Effect of Subsampling

The easiest way to deal with a very large training dataset is to subsample it as discussed in the Background section. Sometimes similar test errors can be achieved with smaller training datasets, and there is no need for large scale learning in these cases. For display advertising, the data is subsampled at 1% and 10%. The results in Table 1 show that there is a noticeable drop in accuracy after subsampling. Note that even if the drop does not appear large at first sight, it can cause a substantial loss of revenue. Thus, for both datasets, the entire training data is needed to achieve optimal performances. The three metrics reported in Table 1 are area under the ROC curve (auROC), area under the precision/recall curve (auPRC) and negative log-likelihood (NLL).

TABLE 1

|       | 1%     | 10%    | 100%   |
|-------|--------|--------|--------|
| auROC | 0.8178 | 0.8301 | 0.8344 |
| auPRC | 0.4505 | 0.4753 | 0.4856 |
| NLL   | 0.2654 | 0.2582 | 0.2554 |

Running Time

Five iterations of L-BFGS have been run on the splice site data with 1000 nodes. On each node, for every iteration, the time spent in AllReduce operation and the computing time—defined as the time not spent in AllReduce operation—are recorded. The time spent in AllReduce operation can further be divided into stall time—waiting for other nodes to finish their computation—and communication time. The communication time can be estimated by taking the minimum value of the AllReduce times across nodes.

The distribution of the computing times is of particular interest because the speed of the algorithm depends on the slowest node. Statistics are shown in Table 2. In Table 2, times are average per iteration (excluding the first one) for the splice site recognition problem. The first row is without speculative execution while the second row is with speculative execution. It appears that most computing times are concentrated around the median, but there are a few outliers. Without speculative execution, one single node was about 10 times slower than the other nodes; this has the catastrophic consequence of slowing down the entire process by a factor 10. The use of speculative execution successfully mitigated this issue, as noted above.

TABLE 2

|         | 5% | 50% | 95% | Max | Comm. time |
|---------|----|-----|-----|-----|------------|
| Without | 29 | 34  | 60  | 758 | 26         |
| With    | 29 | 33  | 49  | 63  | 10         |

Figure 12:
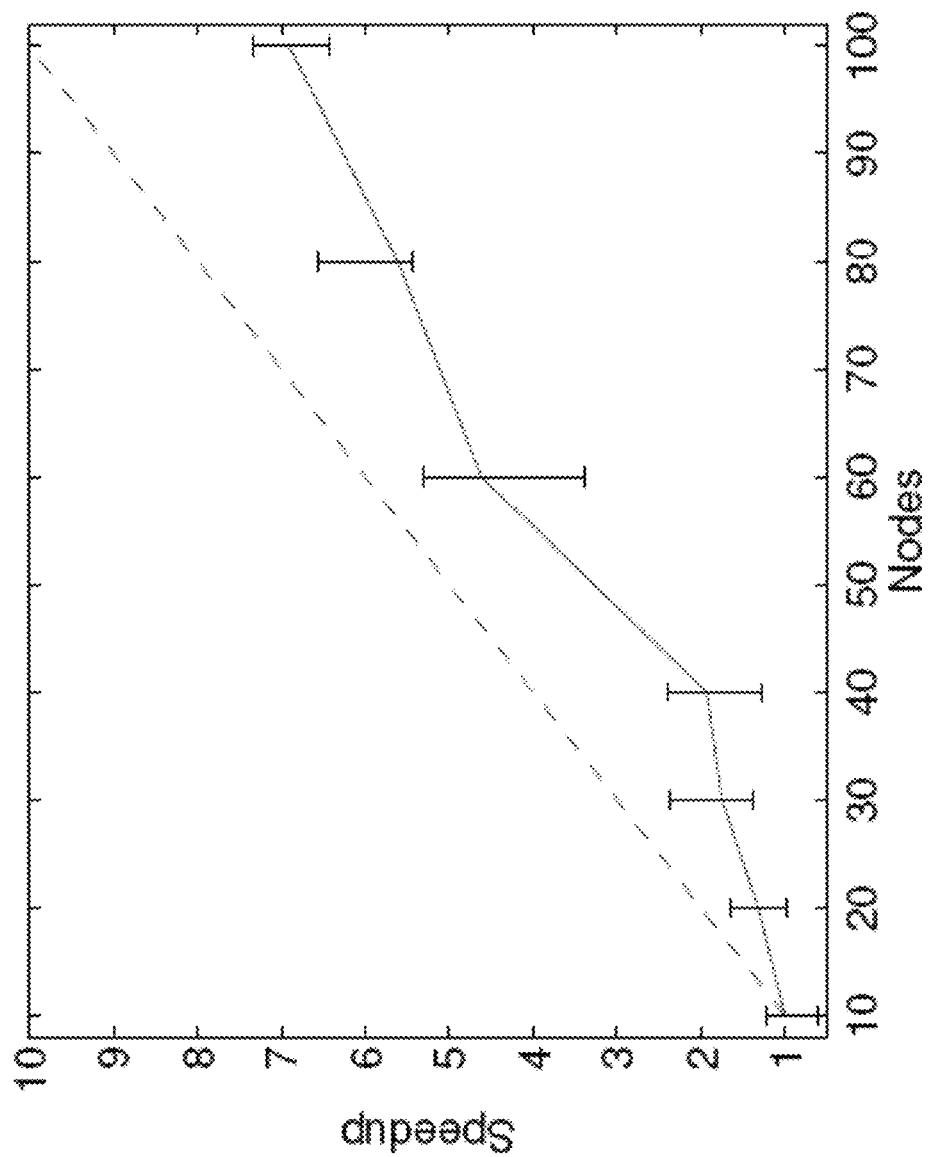
FIG. 12 illustrates speed-up, on a display advertising problem solved by the system for distributed machine learning, relative to a run with 10 nodes, as a function of the numbers of nodes.

The test of running time as a function of the number of nodes has been performed as well. For the display advertising problem, the number of nodes is varied from 10 to 100, and the speed-up factor relative to the run with 10 nodes is calculated. In each case, the amount of time needed to get to a fixed test error is tested. Since there can be significant variations from one run to the other—mostly because of the cluster utilization—each run was repeated 10 times. Results are shown in FIG. 12. It is noted that speculative execution was not turned on in this experiment, and better speedups with speculative execution are expected.

Table 3 shows the running times for attaining a fixed test error as a function of the number of nodes on the splice site recognition problem. The first three rows are average per iteration (excluding the first one). Unlike FIG. 12, these timing results have not been repeated and there is thus a relatively large uncertainty on their expected values. It can be seen from Tables 2 and 3 that even with as many as 1000 nodes, communication is not the bottleneck. One of the main challenges instead is the "slow node" issue, which may be mitigated by the processing described in FIG. 9, as discussed above.

TABLE 3

| Nodes | 100 | 200 | 500 | 1000 |
|---|---|---|---|---|
| Comm time/pass | 5 | 12 | 9 | 16 |
| Median comp time/pass | 167 | 105 | 43 | 34 |
| Max comp time/pass | 462 | 271 | 172 | 95 |
| Wall clock time | 3677 | 2120 | 938 | 813 |

An eight times larger version of the display advertising data (16 B examples) has also been tested. Using 1000 nodes and 10 iterations over the data, the training took only 70 minutes.

Online and Batch Learning

Figure 13:
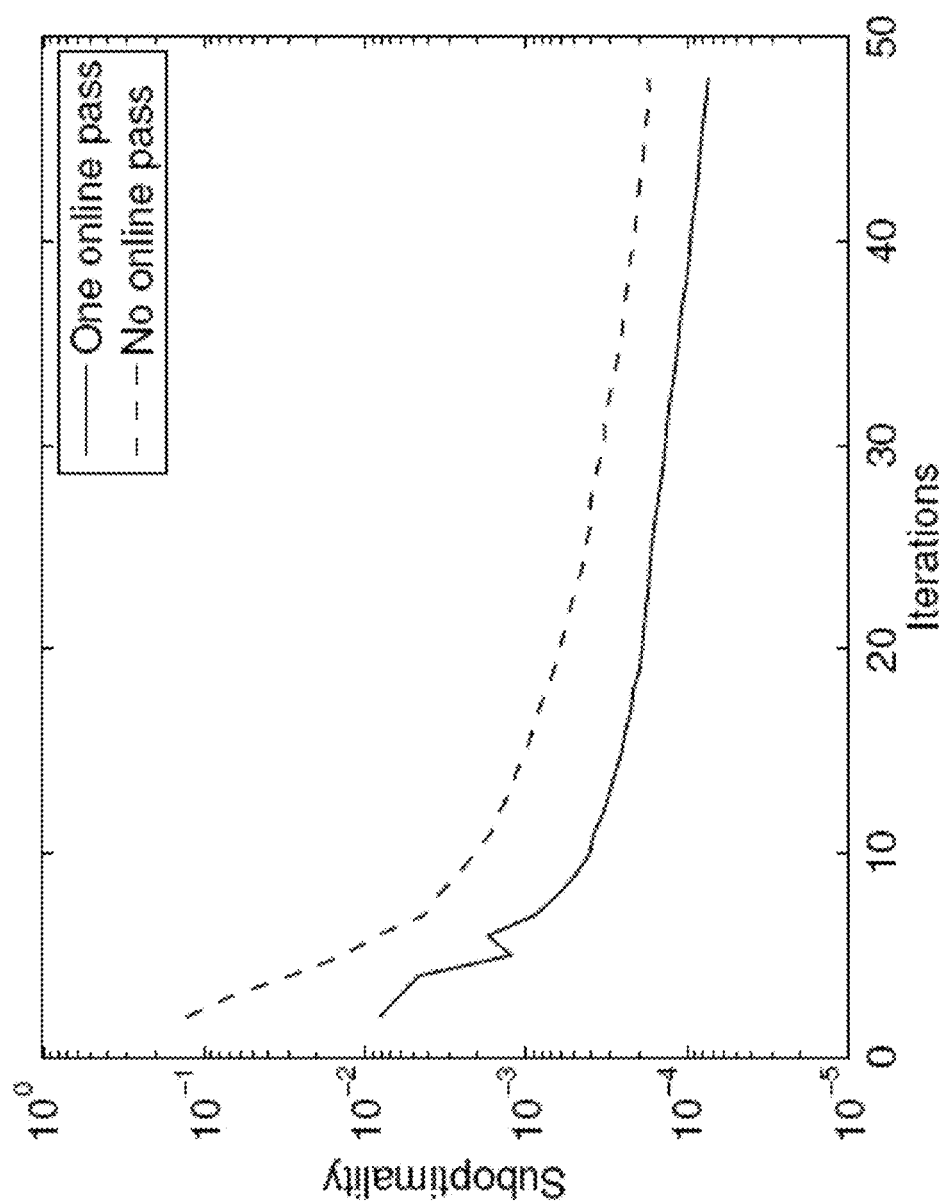
FIG. 13 illustrates effect of initiating L-BFGS optimization by an average solution from online runs on individual nodes using the system for distributed machine learning.

The number of iterations needed to reach a certain test performance has been tested for different learning strategies: batch, online, and hybrid. FIG. 13 compares two learning strategies—batch with and without an initial online pass—on the training dataset. It plots the optimality gap, defined as the difference between the current objective function and the optimal one (i.e. minimum value of the objective in Equation (1)), as a function of the number of iterations. FIG. 13 shows that the initial online pass results in a saving of about 10-15 iterations.

Figure 14:
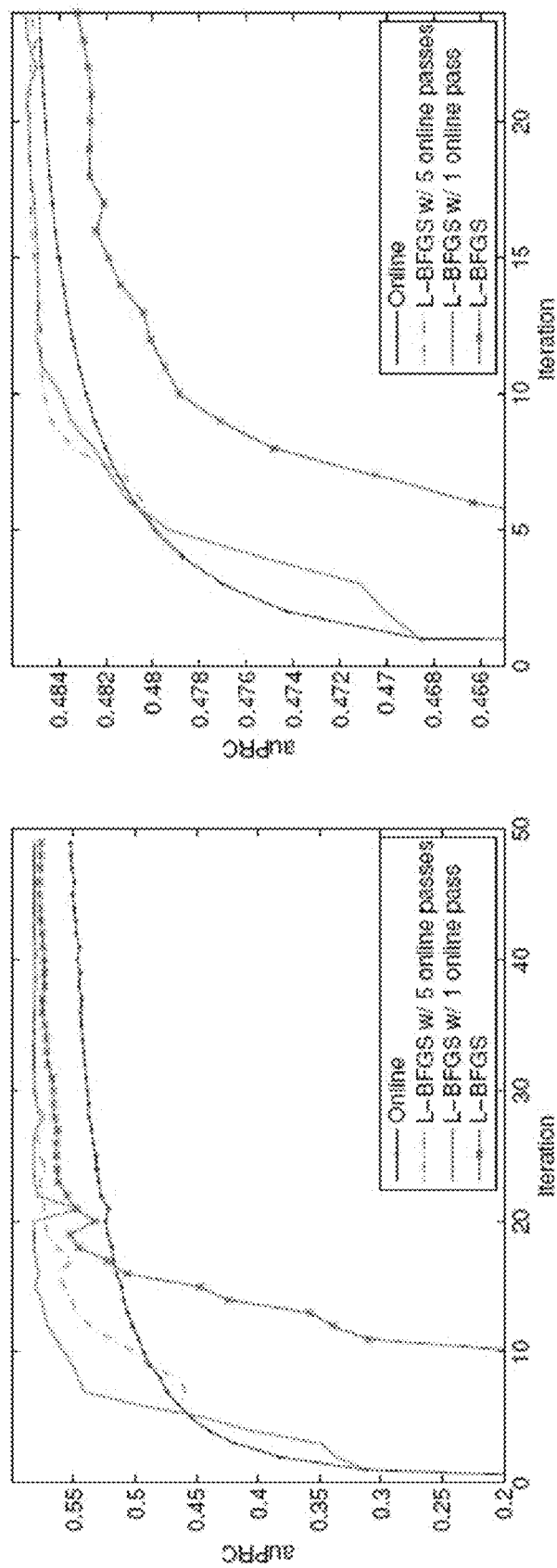
FIG. 14 illustrates test results of area under the ROC curve (auPRC) for four different machine learning strategies using the system for distributed machine learning.

FIG. 14 shows the test auPRC, on both datasets, as a function of the number of iterations for four different strategies: only online learning, only L-BFGS learning, and two hybrid methods consisting of one or five passes of online learning followed by L-BFGS optimization. L-BFGS with one online pass appears to be the most effective strategy. For the splice recognition problem, an initial online pass and 14 L-BFGS iterations yield an auPRC of 0.581. This was achieved in 1960 seconds using 500 machines.

Averaging

Table 4 compares picking one online run at random, using uniform weight averaging, or using non-uniform weight averaging according to Equation (2) from adaptive updates. Note that the random pick for splice was apparently lucky, and that weighted averaging works consistently well.

TABLE 4

| | No avg. | Unif. avg. | Weighted avg. |
|---|---|---|---|
| Display | 0.4729 | 0.4815 | 0.4810 |
| Splice | 0.4188 | 0.3164 | 0.4996 |

AllReduce vs. MapReduce

The standard way of using MapReduce for iterative machine learning algorithms is the following: every iteration is a MapReduce job where the mappers compute some local parameters (e.g., gradients) and the reducers sum them up. This is ineffective because each iteration has large overheads (e.g., job scheduling, data transfer, data parsing, etc.). Table 5 compares the average training time per iteration of an internal logistic regression implementation using either MapReduce or AllReduce for gradients aggregation on the display advertising dataset. Table 5 confirms that HADOOP MapReduce has substantial overheads since the training time is not much affected by the dataset size. The speedup factor of AllReduce over HADOOP MapReduce can become extremely large for smaller datasets and remains noticeable even for the largest datasets.

TABLE 5

| | Full size | 10% sample |
|---|---|---|
| MapReduce | 1690 | 1322 |
| AllReduce | 670 | 59 |

Overcomplete Average

Figure 15:
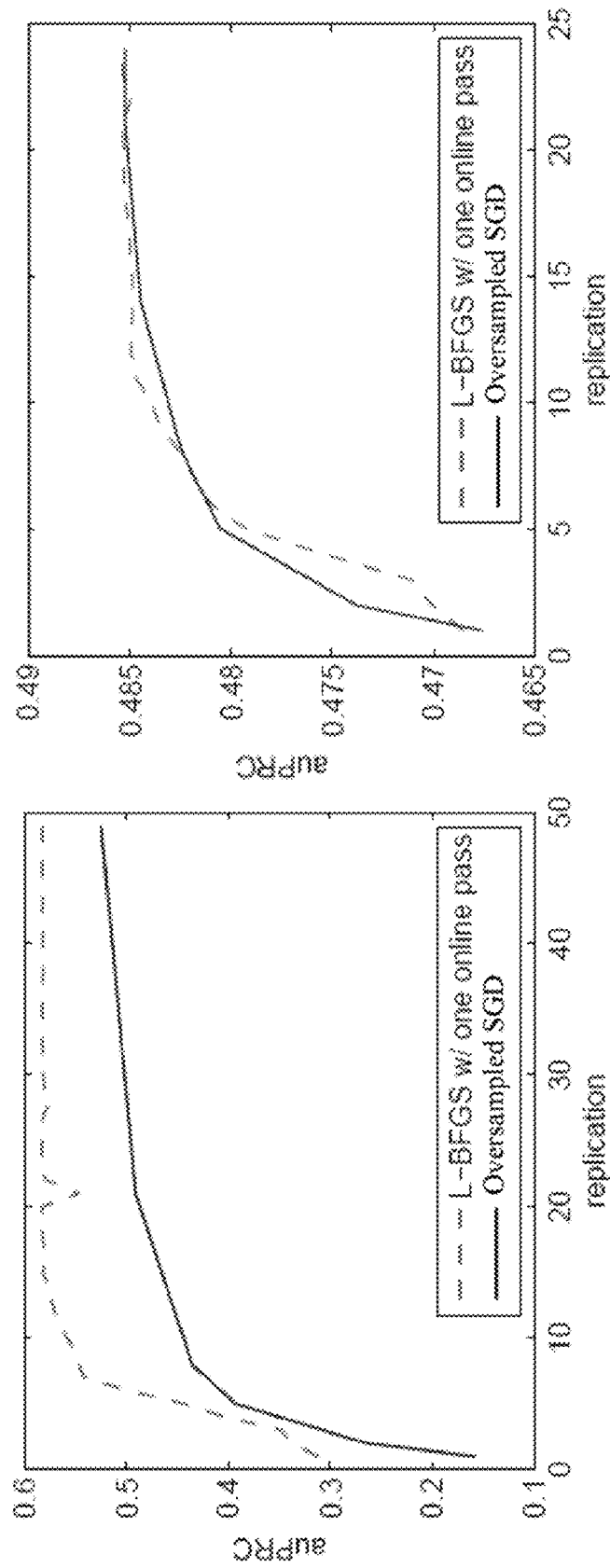
FIG. 15 illustrates test results of auPRC for replication coefficients in an overcomplete stochastic gradient descent (SGD) process with averaging using the system for distributed machine learning.

The performance of oversampled stochastic gradient with final averaging approach has been compared with the exemplary algorithm. In the exemplary algorithm, stochastic gradient descent with the learning rate in the t-th iteration is used as $$\eta_t = \frac{1}{L + \gamma \sqrt{t}},$$

where $\gamma$ and $L$ are tuned on a small subset of the training dataset. As shown in FIG. 15, the oversampled stochastic gradient descent (SGD) is competitive with the exemplary algorithm on the display advertising dataset (the right-side figure), but its convergence is much slower on splice site recognition data (the left-side figure).

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 16:
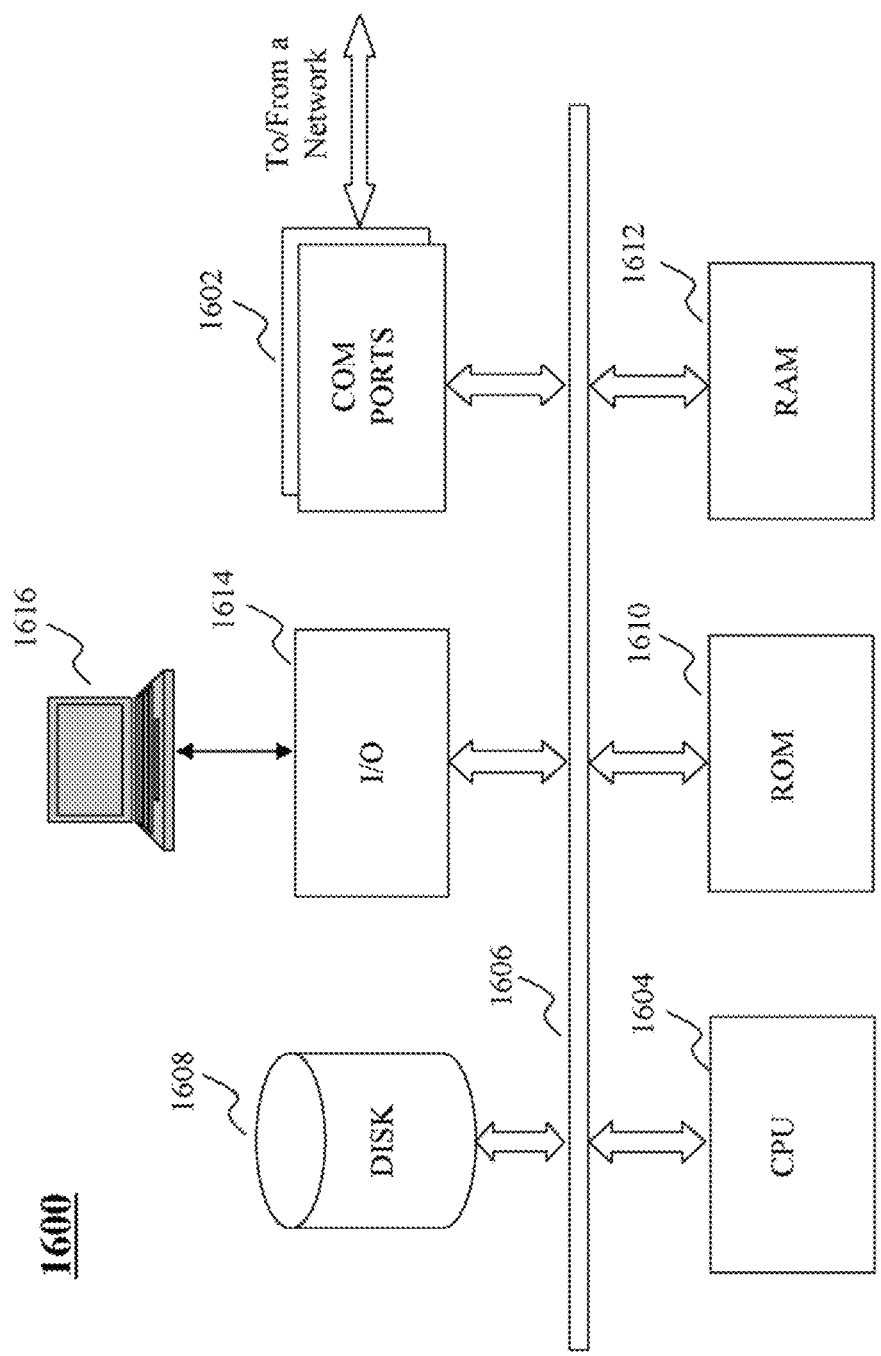
FIG. 16 depicts a general computer architecture on which the present teaching can be implemented.

FIG. 16 depicts a general computer architecture on which the present teaching can be implemented and has a functional block diagram illustration of a computer hardware platform that includes user interface elements. The computer may be a general-purpose computer or a special purpose computer. This computer 1600 can be used to implement any components of the distributed machine learning architecture as described herein. Different components of the system, e.g., as depicted in FIGS. 2 and 3, can all be implemented on one or more computers such as computer 1600, via its hardware, software program, firmware, or a combination thereof. Although only one such computer is shown, for convenience, the computer functions relating to machine learning may be implemented in a distributed fashion on a number of similar platforms, to distribute the processing load.

The computer 1600, for example, includes COM ports 1602 connected to and from a network connected thereto to facilitate data communications. The computer 1600 also includes a central processing unit (CPU) 1604, in the form of one or more processors, for executing program instructions. The exemplary computer platform includes an internal communication bus 1606, program storage and data storage of different forms, e.g., disk 1608, read only memory (ROM) 1610, or random access memory (RAM) 1612, for various data files to be processed and/or communicated by the computer, as well as possibly program instructions to be executed by the CPU. The computer 1600 also includes an I/O component 1614, supporting input/output flows between the computer and other components therein such as user interface elements 1616. The computer 1600 may also receive programming and data via network communications.

Hence, aspects of the method of distributed machine learning, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method, implemented on at least one machine each of which has at least one processor, storage, and a communication platform connected to a network for distributed machine learning on a cluster including a plurality of nodes, the method comprising:

determining a plurality of operation nodes from the plurality of nodes in the cluster, wherein each of the plurality of operation nodes is selected from a plurality of competing nodes of the cluster based on performance of each of the plurality of competing nodes on an identical subset of training data associated with a machine learning job;

forming a network by connecting the plurality of operation nodes;

distributing the machine learning job to the network, where each of the plurality of operation nodes performs a machine learning sub job on a respective subset of the training data;

computing, in each of the plurality of operation nodes, a local parameter related to the machine learning sub-job; and generating an aggregated parameter related to the machine learning job based on the computed local parameters.

2. The method of claim 1, wherein the step of generating an aggregated parameter comprises:

calculating an initial aggregated parameter by merging initial local parameters calculated in each of the plurality of operation nodes;

transmitting the initial aggregated parameter to each of the plurality of operation nodes; and calculating an updated aggregated parameter by merging updated local parameters calculated in each of the plurality of operation nodes, each updated local parameter being calculated based on the initial aggregated parameter and the subset of the training data in each of the plurality of operation nodes.

3. The method of claim 2, wherein a stochastic gradient descent process is performed in each of the plurality of operation nodes for calculating the initial local parameter; and a batch gradient descent process is performed in each of the plurality of operation nodes for calculating the updated local parameter.

4. The method of claim 1, further comprising:

selecting each of the plurality of operation nodes from the plurality of competing nodes based on a processing speed of each of the plurality of competing nodes.

5. The method of claim 1, wherein the determining a plurality of operation nodes further comprises:

dynamically detecting a slow operation node based on a processing speed of each of the plurality of operation nodes;

moving the subset of the training data and the local parameter of the slow operation node to a backup node of the cluster; and replacing the slow operation node with the backup node in the network.

6. The method of claim 1, wherein each of the plurality of operation nodes is selected by:

performing a training process on each of the plurality of competing nodes;

determining a competing node that first finishes the training process;

selecting the determined competing node as the operation node; and stopping the training process on each of the other competing nodes in the plurality of competing nodes.

7. The method of claim 1, wherein each of the plurality of operation nodes is selected by:

performing a training process on each of the plurality of competing nodes;

inquiring a status of each competing node after performing the training process for a predetermined time period; and selecting one of the plurality of competing nodes as the operation node based on the inquired status from each competing node.

8. A system for distributed machine learning, the system comprising:

a plurality of operation nodes, wherein each operation node is configured to perform a machine learning sub job on a respective subset of training data associated with a machine learning job to calculate a local parameter, wherein the training data is partitioned over the plurality of operation nodes; and a coordination node operatively coupled to the plurality of operation nodes, configured to:

determine the plurality of operation nodes from a plurality of nodes, wherein each of the plurality of operation nodes is selected from a plurality of competing nodes based on a performance of each of the plurality of competing nodes on an identical subset of the training data associated with the machine learning job; and form a network by connecting the plurality of operation nodes, wherein the plurality of operation nodes are further configured to generate an aggregated parameter related to the machine learning job by merging local parameters calculated in each of the plurality of operation nodes.

9. The system of claim 8, wherein the plurality of operation nodes are configured to:

calculate an initial aggregated parameter by merging initial local parameters calculated in each of the plurality of operation nodes;

transmit the initial aggregated parameter to each of the plurality of operation nodes; and calculate an updated aggregated parameter by merging updated local parameters calculated in each of the plurality of operation nodes, each updated local parameter being calculated based on the initial aggregated parameter and the subset of the training data in each of the plurality of operation nodes.

10. The system of claim 9, wherein a stochastic gradient descent process is performed in each of the plurality of operation nodes for calculating the initial local parameter; and a batch gradient descent process is performed in each of the plurality of operation nodes for calculating the updated local parameter.

11. The system of claim 8, wherein each of the plurality of operation nodes is selected from the plurality of competing nodes based on a processing speed of the plurality of competing nodes.

12. The system of claim 8, wherein the coordination node is further configured to:

dynamically detect a slow operation node based on a processing speed of each of the plurality of operation nodes;

move the subset of the training data and the local parameter of the slow operation node to a backup node of the cluster; and replace the slow operation node with the backup node in the network.

13. A machine-readable tangible and non-transitory medium having information for distributed machine learning on a cluster including a plurality of nodes recorded thereon, wherein the information, when read by the machine, causes the machine to perform at least the following:

determining a plurality of operation nodes from the plurality of nodes in the cluster, wherein each of the plurality of operation nodes is selected from a plurality of competing nodes of the cluster based on performance of each of the plurality of competing nodes on an identical subset of the training data associated with the machine learning job;

forming a network by connecting the plurality of operation nodes;

distributing the machine learning job to the network, where each of the plurality of operation nodes performs a machine learning sub job on a respective subset of the training data;

computing in each of the plurality of operation nodes, a local parameter related to the machine learning sub-job; and generating an aggregated parameter related to the machine learning job based on the computed local parameters.

14. The medium of claim 13, wherein the step of generating an aggregated parameter comprises:

calculating an initial aggregated parameter by merging initial local parameters calculated in each of the plurality of operation nodes;

transmitting the initial aggregated parameter to each of the plurality of operation nodes; and calculating an updated aggregated parameter by merging updated local parameters calculated in each of the plurality of operation nodes, each updated local parameter being calculated based on the initial aggregated parameter and the subset of the training data in each of the plurality of operation nodes.

15. The medium of claim 14, wherein a stochastic gradient descent process is performed in each of the plurality of operation nodes for calculating the initial local parameter; and a batch gradient descent process is performed in each of the plurality of operation nodes for calculating the updated local parameter.

16. The medium of claim 13, wherein the information, when read by the machine, causes the machine to further perform the following:

selecting each of the plurality of operation nodes from the plurality of competing nodes based on a processing speed of each of the plurality of competing nodes.

17. The medium of claim 13, wherein the determining a plurality of operation nodes comprises
dynamically detecting a slow operation node based on a processing speed of each of the plurality of operation nodes;
moving the subset of the training data and the local parameter of the slow operation node to a backup node of the cluster; and
replacing the slow operation node with the backup node in the network.

18. A method, implemented on at least one machine each of which has at least one processor, storage, and a communication platform connected to a network for distributed machine learning on a cluster including a plurality of nodes, the method comprising the steps of:
storing a subset of training data that is partitioned over the plurality of nodes;
performing a stochastic gradient descent process based on the subset of the training data to calculate an initial local parameter;
transmitting the initial local parameter to at least one connected node in accordance with a network topology, wherein the network topology is formed by connecting a plurality of operation nodes and each of the plurality of operation nodes is selected from a plurality of competing nodes based on a processing speed of each of the plurality of competing nodes;
receiving an initial aggregated parameter from the at least one connected node, wherein the initial aggregated parameter is calculated by merging initial local parameters calculated by each of the plurality of nodes in accordance with the network topology;
performing a batch gradient descent process based on the received initial aggregated parameter and the subset of the training data to calculate an updated local parameter; and
transmitting the updated local parameter to the at least one connected node in accordance with the network topology for calculating an updated aggregated parameter.

19. The method of claim 18, further comprising:
merging the initial local parameter with one or more initial local parameters received from one or more connected nodes in accordance with the network topology; and
merging the updated local parameter with one or more updated local parameters received from the one or more connected nodes in accordance with the network topology.

20. An apparatus comprising:
a storage configured to store a subset of training data that is partitioned over the plurality of nodes;
an AllReducing module configured to:
transmit a local parameter to at least one connected node in accordance with a network topology, wherein the network topology is formed by connecting a plurality of operation nodes and each of the plurality of operation nodes is selected from a plurality of competing nodes based on a processing speed of each of the plurality of competing nodes, and
receive an initial aggregated parameter from the at least one connected node, wherein the initial aggregated parameter is calculated by merging initial local parameters calculated by each of the plurality of nodes in accordance with the network topology; and
a machine learning module configured to:
perform a stochastic gradient descent process based on the subset of the training data to calculate the initial local parameter, and
perform a batch gradient descent process based on the initial aggregated parameter and the subset of the training data to calculate an updated local parameter, wherein the updated local parameter is transmitted to the at least one connected node for calculating an updated aggregated parameter.

21. The apparatus of claim 20, wherein the AllReducing module is further configured to:
merge the initial local parameter with one or more initial local parameters received from one or more connected nodes in accordance with the network topology; and
merge the updated local parameter with one or more updated local parameters received from the one or more connected nodes in accordance with the network topology.

22. A machine-readable tangible and non-transitory medium having information for distributed machine learning on a cluster including a plurality of nodes recorded thereon, wherein the information, when read by the machine, causes the machine to perform the following:
storing a subset of training data that is partitioned over the plurality of nodes;
performing a stochastic gradient descent process based on the subset of the training data to calculate an initial local parameter;
transmitting the initial local parameter to at least one connected node in accordance with a network topology, wherein the network topology is formed by connecting a plurality of operation nodes and each of the plurality of operation nodes is selected from a plurality of competing nodes based on a processing speed of each of the plurality of competing nodes;
receiving an initial aggregated parameter from the at least one connected node, wherein the initial aggregated parameter is calculated by merging initial local parameters calculated by each of the plurality of nodes in accordance with the network topology;
performing a batch gradient descent process based on the received initial aggregated parameter and the subset of the training data to calculate an updated local parameter; and
transmitting the updated local parameter to the at least one connected node in accordance with the network topology for calculating an updated aggregated parameter.

23. The medium of claim 22, further comprising:
merging the initial local parameter with one or more initial local parameters received from one or more connected nodes in accordance with the network topology; and
merging the updated local parameter with one or more updated local parameters received from the one or more connected nodes in accordance with the network topology.

* * * * *